(12) United States Patent
Sampey

(10) Patent No.: US 7,094,737 B1
(45) Date of Patent: Aug. 22, 2006

(54) SUGAR CANE ADDITIVE FOR FILTRATION CONTROL IN WELL WORKING COMPOSITIONS

(76) Inventor: James A. Sampey, 807 Hwy. 308 S., Thibodaux, LA (US) 70301

( * ) Notice: Subject to any disclaimer, the term of this patent is extended or adjusted under 35 U.S.C. 154(b) by 215 days.

(21) Appl. No.: 10/408,533

(22) Filed: Apr. 7, 2003

Related U.S. Application Data

(60) Provisional application No. 60/371,264, filed on Apr. 8, 2002.

(51) Int. Cl.
*C09K 8/035* (2006.01)

(52) U.S. Cl. .................. 507/104; 507/204; 175/72

(58) Field of Classification Search .............. 507/104, 507/204; 175/72
See application file for complete search history.

(56) References Cited

U.S. PATENT DOCUMENTS

| | | | |
|---|---|---|---|
| 3,215,634 A | 11/1965 | Walker | 252/311 |
| 3,299,952 A | 1/1967 | Savins | 166/22 |
| 4,249,954 A * | 2/1981 | Keogh | 106/407 |
| 4,356,096 A | 10/1982 | Cowan | 507/126 |
| 4,439,328 A * | 3/1984 | Moity | 507/204 |
| 4,503,170 A * | 3/1985 | Drake et al. | 523/130 |
| 4,531,594 A | 7/1985 | Cowan | 175/72 |
| 4,649,999 A | 3/1987 | Sandy | 166/295 |
| 4,745,096 A * | 5/1988 | Keogh | 502/413 |

* cited by examiner

*Primary Examiner*—Philip C. Tucker
(74) *Attorney, Agent, or Firm*—Buskop Law Group, P.C.; Wendy Buskop

(57) ABSTRACT

An additive for controlling filtration loss from a well working fluid in contact with a permeable formation, which comprises sugar cane ash, or sugar cane ash and a cellulose-like material, or sugar cane ash, a cellulose-like material and an oleaginous liquid, wherein the sugar cane ash and cellulose-like material have a particle size no more than 300 microns.

7 Claims, No Drawings

SUGAR CANE ADDITIVE FOR FILTRATION CONTROL IN WELL WORKING COMPOSITIONS

The present invention claims priority to Pending Provisional Patent Application Ser. No. 60/371,264 filed in the U.S. Patent and Trademark Office on Apr. 8, 2002.

FIELD OF THE INVENTION

The invention relates to an environmentally friendly additive from sugar cane that can be used in well working compositions for filtration control.

BACKGROUND OF THE INVENTION

The invention relates to a technique for using a specially processed sugar cane ash in drilling fluids and using sugar cane ash with other ingredients to control filtration, wherein the additive does not increases the viscosity of the drilling fluid by more than 10%.

A need has long existed for an environmental-friendly additive for drilling fluids that does not cause the drilling fluid to become thick and viscous.

In the process of drilling oil and gas wells, porous formations are encountered. These formations allow for either whole drilling fluid or filtrate from the drilling fluid to enter the formation. After the fluid enters the formation, a thick layer of solids are deposited along the wellbore acting as a filter. This thick layer of solids, in most instances, causes the drill pipe to become stuck in the wellbore, preventing any further drilling.

The invention relates to compositions for use in well-working operations such as drilling, workover and completion, packing and the like, well-working processes utilizing such compositions, and an additive to assist in filtration control of matter into the formation, creating a more "environmental-friendly" drilling operation.

In the drilling of wells for oil and gas, drilling fluids ("drilling muds") are circulated in such a manner as to remove cuttings and to support the walls of the hole. The fluids may be either (a) water based, comprising for example, clay, polymers, and other additives dispersed in water, or (b) oil based, comprising for example, suspending agents (generally organophilic clays), emulsifiers, stability agents, filtration control agents, weighting agents, and other additives dispersed in a medium, like diesel oil and similar oleaginous mediums.

A thin, low-permeability filter of some form is desired on the sides of the borehole to control the filtration characteristics of the drilling fluid since the pressure of the mud column in the borehole is greater than the formation pressure. A filter forms when the drilling fluid contains particles of a size only slightly larger than the size of the pore openings of the formation. The liquid, which enters the formation while the filter layer is being established, is known as the surge loss or spurt loss. The liquid that enters after the filter layer is formed is known as the drilling fluid filtrate. The permeability of the filter layer is directly related to the particle size distribution in the drilling fluid, and, in general, the filter layer permeability decreases as the concentration of particles in the colloidal size range increases.

The amount of potential filtration from a well depends on the nature of the formations being drilled and on the type of drilling fluid used. Thus, in water-sensitive formations, oil-based mud provides superior filter characteristics when the salinity of the aqueous phase of the mud is adjusted to prevent damage to the formation.

The filtration rate must be controlled when penetrating potentially productive formations in order to minimize any damaging effects from fluids entering the formation. It has been desired to have low cost filtering materials for drilling muds.

When the drilling bit passes through the porous or fractured strata, the hydrostatic pressure caused by the vertical column of drilling fluid can easily exceed the ability of the surrounding earth formation to support this pressure. Consequently, drilling fluid is lost to the formation and fails to return to the surface. This loss may be any fraction up to 100% loss of the total circulating drilling fluid volume. This condition is known in the art as "lost circulation". Even with the best drilling practices, circulation losses can and will occur. Loss zones can be classified as filtration loss, partial loss, or complete loss.

A need has existed to control filtration losses for formations using very fine particles in the mud to provide a filter in the wellbore.

In the rotary drilling of wells with aqueous base drilling fluids, various problems associated with viscosity of the drilling fluid may occur, such as slow drilling rate, excessive drill pipe torque and drag, differential sticking, etc. See for example U.S. Pat. No. 4,356,096, incorporated herein by reference. This patent discloses that liquid-lubricating additives can be adsorbed onto certain hydrophobic, organophilic, absorbents to filter out or deposit in the wall layer on the sides of the borehole. This results in an increased concentration of the liquid lubricant in the wall layer where it is needed. The liquid lubricant can be premixed with the adsorbent before adding the resulting solid lubricating additive to the drilling fluid.

It is object of the present invention to provide an additive that is very effective as a filtration in both water-based and oil-based well-working fluids, that work as a filter and has no harmful environmental side effects.

It is another object of this invention to provide well-working compositions having a filtration control coupled with a "green" or positive environmental benefit.

Still another object of this invention is to provide a method of filtration control for water-based and oil-based well-working fluids using an organic particulate that has been carbonized.

These and other objects of the invention will appear to one skilled in the art as the description thereof proceeds.

SUMMARY OF THE INVENTION

The invention relates to an additive for filtration control usable in a well working fluid that comes in contact with a permeable formation and that comprises sugar cane ash having a particle size distribution of between 1 and 300 microns.

The invention also relates to a drilling fluid containing sugar cane ash for filtration control usable in a well-working fluid in contact with a permeable formation that comprises sugar cane ash, or a mixture of sugar cane ash and 50 to 90 wt % of another cellulose-like material such as oat hulls, cotton burrs, paper, bagasse, wood, peat, kenaf, rice hulls, rice bran, cottonseed hulls, soybean hulls, straw, peanut shells, nut shells, cotton, and mixtures thereof, for a drilling fluid containing sugar cane ash, another cellulose-like material and an oleaginous liquid to reduce filtration.

DETAILED DESCRIPTION

In accordance with one illustrative embodiment of the invention, sugar cane ash is effective in both water-based and oil-based well-working fluids to control filtration thereof, provided that the sugar cane ash has a particle size distribution such that less than about 50% of the particles are greater than 300 microns.

The ash is an inert material that plugs the pore spaces and either eliminates or greatly diminishes the amount of fluid lost into the porous formations. It can also be used for filtration in wells in an environmental-friendly manner.

In accordance with another embodiment of the invention, sugar cane ash can be mixed with a cellulose-like particulate material selected from the group consisting of oat hulls, cotton burrs, beet pulp, paper, bagasse, wood, peat, kenaf, rice hulls, rice bran, cottonseed hulls, soybean hulls, straw, peanut shells, nut shells, cotton, and mixtures thereof to improve the filtration abilities of certain water-based and oil-based well-working fluids, provided that the particulate mixture has a particle size distribution such that less than about 50% of the particles have a diameter less than 300 microns.

In accordance with another embodiment of the invention, the invention can contain sugar cane ash and an oleaginous liquid and a cellulose-like material, wherein the cellulose-like material is selected from the group consisting of oat hulls, cotton burrs, citrus pulp, beet pulp, paper, bagasse, wood, corn cobs, kenaf, peat, rice hulls, rice bran, cottonseed hulls, soybean hulls, nut shells, straw, and mixtures thereof, is effective as a filtration control additive in water-based and oil-based well-working fluids provided that the cellulose-like material has a particle size distribution such that less than about 50% of the particles have a diameter less than 500 microns.

The sugar cane ash usable in this invention can be prepared as follows:

Sugar cane stalks are collected and taken to a mill to treat, or alternatively, the sugar cane stalks are cut in the field and let dry. For the stalks in the field, after drying, they are typically burned to remove leaves and other particles. The burned stalks are then cut into small pieces, such as with a combine, and then collected and taken to a mill. Typically, the 12 to 16-foot sugar cane stalks are cut into pieces having a length between 6 and 7 inches. Optionally, machines are used to further remove leafy material from the stalks.

Next the sugar cane stalks are squeezed to release sap and sugar water. This step can be accomplished by placing the stalks on a sugar cane table and then running the cane stalks through a series of rollers, optionally making several passes through the rollers to remove a substantial amount of liquid from the stalks. A typical cane table is a flat table surface oriented at a 30-degree angle that enables the cane to move onto a cane carrier and into the mill for squeezing. The squeezed stalks are called bagasse.

Optionally, the bagasse can be mixed with natural gas to create a fuel, or, the bagasse can be used without the addition of fuel in boilers to create steam that runs the mills. The BTU content of the bagasse is affected by water content, and the water content of the bagasse typically needs to be about 50% or less.

In a preferred embodiment at one mill, the stalks are pressed six times yielding 65% liquid, and 35% fiber. Tests are typically performed by a mill to determine if enough water is removed from the cane stalks prior to the use of bagasse as fuel.

The bagasse is burned as a fuel in a furnace to power a facility, such as a mill. The resulting ash is removed from the furnace and sugar cane ash is created, which is environmental-friendly and inert.

It should be noted that the bagasse does not need to be mixed with natural gas to make the sugar cane ash unless the sugar cane stalks are harvested during conditions of heavy rain and mud.

The bagasse is burned in a few minutes in a furnace; a flash burn process forms the sugar cane ash.

It should be noted that the sugar cane ash is created from bagasse that is often mixed with sand, dirt, gravel, silica or rock that comes in with the cane stalks from the field. Even though most of the dirt is removed, up to 20 wt % dirt, sand, silica, rock, gravel or similar material could be included in the resultant sugar cane ash. The ash is then processed to decrease the concentration of these contaminants and remove material that is larger than 300 micron.

The sugar cane ash is generally processed to provide the particle size distribution necessary as set forth herein. Similarly, if cellulose-like material is added to the sugar cane ash, the cellulose may be treated to create the desired particle size, either by milling, or some other conventional particle-reduction technique.

Alkali metals, preferably sodium and/or potassium, hydroxide or basic salt thereof, such as carbonate, sulfite, acetate, and the like, can be added to the optional cellulose-like material then water or steam or both can be applied to the particles. Preferably, the moistened particles are then extruded through a die to produce powder. This powder can be coated, such as with an environmental-friendly material that passes the shrimp test, to reduce powder explosions.

The heat generated in the extrusion process will usually suffice to dry the material. The treated material can be more finely ground by milling the material with an attrition mill, which is capable of grinding the particulate material. A Micro Pulverizer is suitable provided that the feed rate to the mill is controlled to give the desired particle size.

Other finely ground material can be optionally mixed with the sugar cane ash to produce a fluid which does not increase the viscosity of the resultant drilling fluid by more than 10% yet still assists in filtration control.

Different methods have been developed for particle size measurement. The preferred method for use in this invention is to measure the sugar cane ash and cellulose-like material with a particle size analyzer, which is capable of measuring 1-micron diameters.

The well working compositions of the invention can be prepared by adding the sugar cane ash to the carrier, which can be oil, water or mixtures of oil and water, or adding a mixture of sugar cane ash with other cellulose-like materials to that carrier, or a mixture of sugar cane ash, cellulose material and oleaginous liquid to that carrier. It should be noted that the drilling fluid carrier can be either a water-based carrier or an oil-based carrier.

A water-based well-working composition will generally contain a suspending agent, such as clay or polymer, weight material which may be insoluble, such as barite, siderite, galena, hematite, and the like, or which may be a soluble salt such as sodium chloride, potassium chloride, calcium chloride, calcium bromide, zinc bromide and the like, fluid loss additives such as starch, carboxymethyl cellulose, carboxymethyl starch, polyacrylates and other polymers, and other additives such as viscosity control agents, oil, lubricants, emulsifiers, lost circulation materials and other functional additives. Oil-based well-working fluids will generally contain additives that provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamines, environmentally friendly glycols, glycerols and similar organic, environmental-friendly alcohols.

The amount of the additive of this invention added to the well-working fluid needs only to be an amount that is effective in filtration control. One example contemplates that between 1 and 30 pounds of additive can be added per barrel of well-working-fluid carrier and between 10 and 15 pounds of additive can be used per barrel of fluid carrier for the drilling fluid.

An oleaginous liquid can be added to aqueous-based well-working fluids containing the sugar cane ash or mixtures of sugar cane ash and cellulose-like materials of this invention as set forth herein. The additive absorbs the oleaginous liquid and concentrates it on the sides of the well, generally increasing filtration control. The well-working fluid may contain an amount of the oleaginous liquid in excess of the amount, which can be absorbed by the additive.

The oleaginous liquid may be a high-boiling-point liquid hydrocarbon of the type used in well working fluids, such as glycol or glycerol. Other oleaginous materials may also be used. The oleaginous liquid may be a solution of a solid oleaginous material in a suitable organic solvent. Preferably, the organic solvent is also an oleaginous liquid. The oleaginous liquid may be a solid at ambient temperature and pressure provided that the temperature and pressure while mixing with the additive are such that the oleaginous solid is converted to an oleaginous liquid.

The additive can be used with Gilsonite or other asphaltene-type material to stabilize troublesome shale sections in a well. Since Gilsonite is not water soluble or dispersible, a wetting agent should be mixed with the Gilsonite composite material to ensure adequate dispersion of the Gilsonite in the aqueous based drilling fluid. Preferred wetting agents are non-ionic surfactants such as polyethoxylated alcohols, alkyl phenols, and organic materials, which contain at least one hydroxyl group and a large hydrocarbon radical within their molecular structure.

Gilsonite and asphaltic-type materials have been used to stabilize sloughing shales to reduce borehole erosion. It is theorized that the Gilsonite penetrates the shale pore spaces, micro-fractures, and bedding planes of the shale as the drill bit penetrates the formation. Presumably the Gilsonite extrudes into the pores, fractures, and bedding planes to reduce or minimize filtrate and whole mud invasion and thus bond the matrix to prevent sloughing. The additive of this invention then functions to bridge across the surface of the shale enhancing the filtration characteristics of the drilling fluid into the formation. A filter layer forms on the sides of the borehole thus controlling loss of fluid into the formations contacted by the drilling fluid.

A polymer can be admixed with the additive of this invention to form a plugging agent for boreholes experiencing gross lost circulation of whole mud to the formation, i.e., circulation losses greater than about 10 bbl/hr. The plugging agent will be added to either an aqueous liquid or an oleaginous liquid, depending on the properties of the polymer, at a concentration of about 10 ppb to about 75 ppb. Thereafter, an additive may be added, and the plugging liquid pumped as a "pill" or "slug" to the zone of lost circulation in the well. The type of additive and its concentration is chosen such that the plugging liquid forms a rubbery, semi-solid mass by the time that it reaches the lost circulation zone.

Suitable water-soluble or water-dispersible polymers for use in aqueous liquids are polymers containing hydroxyl groups located on adjacent carbon atoms. Suitable polysaccharides are disclosed in Walker U.S. Pat. No. 3,215,634, incorporated herein by reference. Dihydroxypropyl-modified polysaccharides as disclosed in Sandy et al. U.S. Pat. No. 4,649,999, incorporated herein by reference, as is polyvinylalcohol (see Savins U.S. Pat. No. 3,299,952, incorporated herein by reference).

EXAMPLE 1

An Additive of Sugar Cane Ash for Drilling Fluid Carriers to Control Filtration 100 wt % sugar cane ash consisting of up to 20 wt % of another inert material, such as dirt, gravel, sand, silica or combinations thereof. The sugar cane ash is prepared by a process of first harvesting or burning the sugar cane stalks and then collecting them from the field, cutting the cane into small pieces, squeezing the small pieces of sugar cane stalks in a mill to remove a substantial amount of liquid (up to 65% by weight from the stalks), forming bagasse, burning the bagasse forming sugar cane ash.

EXAMPLE 2

An Additive for Drilling Fluid Carriers to Control Filtration Comprising Sugar Cane Ash and Cellulose 50 wt % sugar cane ash formed by the process of Example 1, and 50 wt % of cellulose material such as cotton burrs, bagasse, corn cobs, cotton, peanut shells, citrus pulp, beet pulp, rice bran, rice hulls, paper, wood flour, peat, and cottonseed hulls, and combinations thereof with the oat hulls.

EXAMPLE 3

An Additive for Drilling Fluids to Control Filtration Consisting of Sugar Cane Ash, Cellulose Material and an Oleaginous Liquid 50 wt % sugar cane ash made by the method of Example 1, 40 wt % cellulose material, 10 wt % oleaginous liquid, and the material was evaluated at 25 ppb.

The ability of the fluid to seal off a porous sand can be evaluated in the following manner: A standard API Filer Paper was placed in a standard API filter press, one bbl equivalent of a fluid sample was added to the API cell and 100 psi differential pressure was applied as in the standard API fluid loss test; thereafter, the fluid which seeped through the filter paper was caught for 30 minutes. The volume of the fluid, which seeped through the filter paper, was measured over the period of 30 minutes.

EXAMPLE 4

A Drilling Fluid to Control Filtration 40 wt % carrier, and
60 wt % sugar cane ash made by the method of Example 1.

EXAMPLE 5

A Drilling Fluid to Control Filtration Having Sugar Cane Ash and a Cellulose Material 40 wt % carrier,
40 wt % sugar cane ash made by the method of Example 1, and
20 wt % of cellulose material consisting of cotton burrs, bagasse, corn cobs, cotton, peanut shells, citrus pulp, beet pulp, rice bran, rice hulls, paper, wood flour, peat, and cottonseed hulls, and combinations thereof.

EXAMPLE 6

A Drilling Fluid to Control Filtration with Sugar Cane Ash with Cellulose Material and an Oleaginous Liquid 40 wt % carrier,
30 wt % sugar cane ash made by the method of Example 1,
20 wt % cellulose material, and
10 wt % oleaginous liquid.

The following claims further describe the invention.

What is claimed is:

1. An additive comprising sugar cane ash having a particle size distribution of between 1 and 300 microns, and wherein said additive does not increase the viscosity of a well working fluid more than 10%, wherein the additive further comprises between 1 wt % and 15 wt % of an inert material selected from the group consisting of gravel, sand, dirt, silica and combinations thereof; and further comprising between 10 wt % and 50 wt % cellulose-like material selected from the group consisting of corn cobs, peat, paper, rice bran, oat hulls, cotton burrs, bagasse, wood, kenaf, rice hulls, rice bran, cottonseed hulls, soybean hulls, straw, peanut shells, nut shells, cotton, and mixtures thereof, provided that the cellulose like material has the particle size between 1 and 300 microns.

2. The additive of claim 1, further comprising additional components consisting of dispersants, viscosity improvers, stabilization agents, and fillers.

3. An additive for controlling filtration of a well-working fluid in contact with a permeable formation which comprises 10 wt % to 50 wt % of sugar cane ash having a particle size distribution of between 1 and 300 microns, and wherein said additive does not increase the viscosity of the well working fluid more than 10%, and from 10 wt % to 50 wt % of a cellulose-like material selected from the group consisting of oat hulls, cotton burrs, paper, bagasse, wood, corn cobs, kenaf, peat, rice hulls, rice bran, cottonseed hulls, soybean hulls, nut shells, straw, and mixtures thereof, provided that the cellulose-like material has the particle size distribution between 1 and 300 microns, and an oleaginous liquid.

4. The additive of claim 3, wherein the oleaginous liquid is a member of the group: glycerol and glycol.

5. A drilling fluid having filter control characteristics, comprising a carrier selected form the group consisting of water, oil and mixtures thereof, and between 10 wt % and 50 wt % sugar cane ash and 10 wt % to 50 wt % of a cellulosic material selected from the group consisting of oat hulls, cotton burrs, paper, bagasse, wood, peat, kenaf, rice hulls, rice bran, cottonseed hulls, soybean hulls, straw, peanut shells, nut shells, cotton, and mixtures thereof, wherein the sugar cane ash and the cellulose material have particle sizes between 1 and 300 microns.

6. A drilling fluid having filter control characteristics, comprising a carrier selected from the group consisting of water, oil and mixtures thereof; and further comprising sugar cane ash and a cellulose-like material selected from the group consisting of oat hulls, cotton burrs, paper, bagasse, wood, corn cobs, kenaf, peat, rice hulls, rice bran, cottonseed hulls, soybean hulls, nut shells, straw, and mixtures thereof, wherein said sugar cane ash, and said cellulose-like material have a particle size distribution between 1 and 300 microns.

7. The drilling fluid of claim 6, further wherein 10 wt % to 40 wt % sugar cane ash, 10 wt % to 40 wt % cellulose-like material and 1 wt % to 20 wt % oleaginous liquid is used.

* * * * *